United States Patent [19]

Wakabayashi et al.

[11] 4,304,489
[45] Dec. 8, 1981

[54] SYSTEM FOR MEASURING AN OPTICAL LOSS IN A SINGLE MODE OPTICAL FIBER

[75] Inventors: Hiroharu Wakabayashi, Kawasaki; Yasuhiko Niiro, Yokohama, both of Japan

[73] Assignee: Kokusai Denshin Denwa Co., Ltd., Tokyo, Japan

[21] Appl. No.: 144,863

[22] Filed: Apr. 29, 1980

[30] Foreign Application Priority Data

May 17, 1979 [JP] Japan .................................. 54-59744

[51] Int. Cl.³ ............................................. G01N 21/84
[52] U.S. Cl. .................................... 356/73.1; 356/434
[58] Field of Search ....................... 356/73.1, 434, 435

[56] References Cited

PUBLICATIONS

Research Application Report vol. 27, No. 2 (1978) published by Nippon Telegraph & Telephone Public Corp. pp. 394–395.
"Measurement of Baseband Frequency Response of Multimode Fibre by Using a New Type of Mode Scrambler."

Tokuda et al., Electronics Letters, vol. 13, No. 5 pp. 146–147, Mar. 3, 1977.

Primary Examiner—Vincent P. McGraw
Attorney, Agent, or Firm—Armstrong, Nikaido, Marmelstein & Kubovcik

[57] ABSTRACT

An optical loss in a single mode optical device is measured by utilizing multi-mode equipment. The present system comprises of an optical source (1), a sample (30) to be tested, a reference optical attenuator (31) for replacing the optical loss in the sample (30), a first optical switch (40) provided between the optical source (1) and the sample (30) through a single mode optical fiber, a second optical switch (41) provided between the sample (30) and the light receiver (2) through the multi-mode optical fiber, said reference optical attenuator (31) being provided between the first optical switch (40) and the second optical switch (41) so that the optical path is switched either to the sample (30) or to the reference attenuator (31), the optical fiber between the sample (30) and the second optical switch (41) and the optical fiber connected to the input and the output of the reference attenuator (31) being a multi-mode optical fiber.

7 Claims, 11 Drawing Figures

SYSTEM FOR MEASURING AN OPTICAL LOSS IN A SINGLE MODE OPTICAL FIBER

BACKGROUND OF THE INVENTION

The present invention relates to a system for measuring an optical loss in an optical transmission line and/or an optical device like an optical switch or an optical divider utilized in an optical communication, in particular, relates to such a system for measuring an optical loss in a single mode optical fiber which is considerably thin, and/or in an optical device for a single mode optical fiber.

Two of the prior systems for measuring an optical loss in an optical fiber and/or an optical device are a cut-back system and the insertion loss measuring system.

FIGS. 1A and 1B show the principle of a prior cut-back system. In those figures, the light source 1 and the light receiver 2 are connected by the optical fiber 3 of which the optical loss is to be measured. After the loss in the optical fiber 3 is measured, that optical fiber 3 is broken at the point (a) which is near the optical source 1, and the optical loss until the point (a) is measured again. Then, by comparing the optical loss between that at the point (a) of FIG. 1B and that of the long fiber 3 of FIG. 1A, the transmission loss in the optical fiber 3 can be obtained.

Generally, in order to measure the optical loss, a measuring system and a device to be measured must be coupled, and the coupling loss generated at the coupling point between that measuring system and the device to be measured is inevitable. Although that coupling loss can be estimated, that coupling loss can not be separated from the measured data, and so the coupling loss appears as an error of measuring.

With regard to that coupling error, the cut-back system has the advantage that the coupling loss between the optical fiber 3 and the light receiver 2 is small since the diameter of the light receiver 2 is extremely larger than that of the optical fiber 3. However, that cut-back system has the disadvantages that the fiber to be tested must be broken, and the measured result depends upon the fluctuation and/or the linearity characteristics of the light source and/or the light receiver, since this system is based upon the measurement of the absolute values of the loss.

Another prior art, the insertion loss measuring system is shown in FIG. 2. The sample 3 to be tested is connected to the measuring system 4 at the coupling points (c) and (d), and the difference between the loss in the sample 3 and the reference loss prepared in the measuring system 4. This insertion loss measuring system has the advantage that the loss is measured without breaking an optical fiber, but has the disadvantage that the coupling loss is still included in the measured data, and increases the error of the measuring.

By the way, it has been well known that the substitution method for measuring the loss in an electrical circuit provides the excellent accuracy. FIG. 3 shows that substitution method. In FIG. 3, the reference numeral 5 is a signal generator, 6 and 7 are switches, 8 is a signal level detector, 11 is a sample to be tested, and 12 is a reference variable attenuator. One of the sample 11 and the reference attenuator 12, is selected by the switches 6 and 7, and the variable attenuator 12 is adjusted so that the level at the level detector 8 is constant irrespective of the switching between the sample 11 and the reference attenuator 12, then, the loss in the sample 11 is measured as the same as the loss in the reference attenuator 12. The substitution method has the advantages that the non-linearity characteristics of the level detector 8, and that the measured result is free from the fluctuation of the signal generator 5 and the level detector 8.

However, the application of the substitution method to an optical communication field has some problems some of which are the stability of characteristics of an optical switch and/or an optical attenuator, and the coupling between optical fibers. In those points, as far as a multimode optical fiber which has the core diameter of 50 $\mu$m is concerned, an excellent optical switch and an optical attenuator have been developed and are available on the market. Further, the coupling loss between multi-mode optical fibers is sufficiently small.

However, when a single mode optical fiber which has the diameter of less than 10 $\mu$m is concerned, a satisfactory optical switch and/or an optical attenuator can not be obtained since the size of those devices is too small to produce. Although we try to produce that optical switch and optical attenuator for a single mode optical fiber, the insertion loss in the switch or the attenuator itself is large, and the characteristics of those devices are not stable.

Accordingly, the application of the substitution method to the measurement of a single mode optical fiber has been impossible.

SUMMARY OF THE INVENTION

It is an object, therefore, of the present invention to overcome the disadvantages and limitations of a prior optical loss measuring apparatus by providing a new and improved system for the measurement of an optical loss.

It is also an object of the present invention to provide a system for measuring an optical loss in a single mode optical fiber with simple structure and accurate measured result.

The above and other objects are attained by a system for measuring an optical loss in a single mode optical device comprising of an optical source, a sample to be tested, a reference attenuator for replacing the optical loss in the sample, a first optical switch provided between the optical source and the sample through a single mode optical fiber, a second optical switch provided between the sample and the light receiver through an optical fiber, the optical fiber between the sample and the second optical switch and the optical fiber between the second optical switch and the light receiver having a larger numerical aperture than that of the sample to be tested.

Preferably, the optical fiber having a larger numerical aperture is a multi-mode optical fiber.

Preferably, the reference attenuator is connected between the first optical switch and the second optical switch through a multi-mode optical fiber so that the optical path is switched either to the sample or to the reference attenuator.

BRIEF DESCRIPTION OF THE DRAWINGS

The foregoing and other objects, features, and attendant advantages of the present invention will become better understood by means of the following description and accompanying drawings wherein.

DESCRIPTION OF THE PREFERRED EMBODIMENT

Figure 1A:
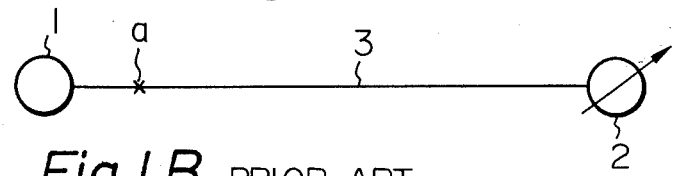
FIG. 1(A) and FIG. 1(B) are explanatory drawings of the prior cut-back measuring system for an optical loss.
Figure 1B:
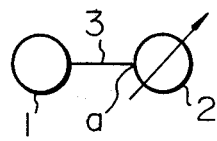
Figure 2:
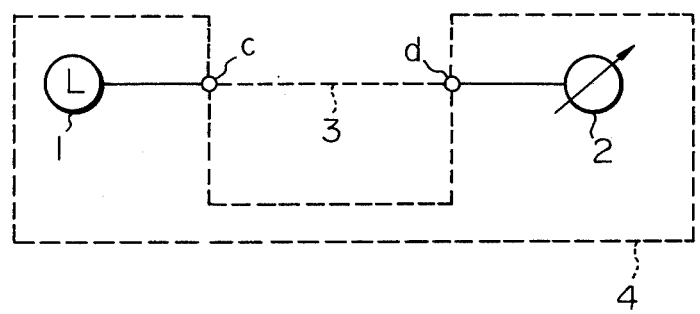
FIG. 2 is the explanatory drawing of the prior measuring system which inserts an artificial loss.
Figure 3:
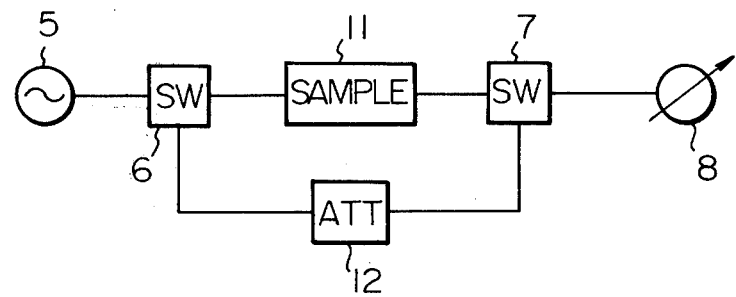
FIG. 3 is the explanatory drawing of the prior measuring system in which a loss is substituted by the reference loss.
Figure 4:
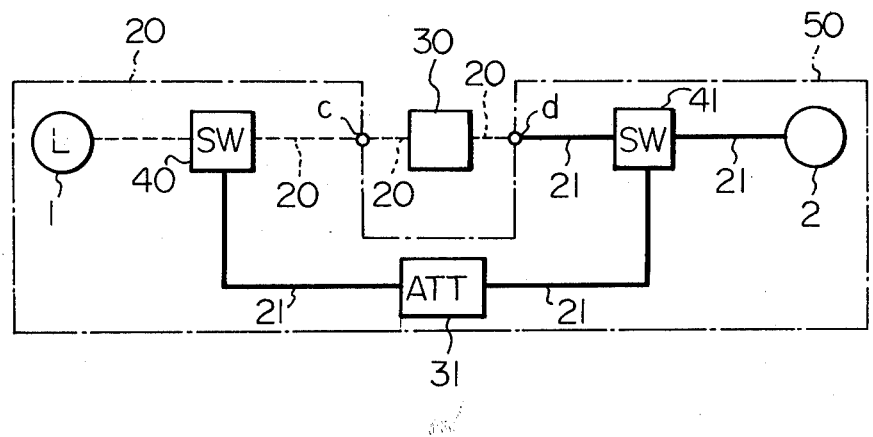
FIG. 4 is the block diagram of the optical loss measuring system according to the present invention.

FIG. 4 shows the measuring system of an optical loss according to the present invention. In the figure, the reference numeral 1 is an optical source, 2 is a light receiver, 31 is a reference optical attenuator, 40 and 41 are optical switches for selecting one of the sample to be tested and the reference attenuator 31. Those elements 1, 2, 31, 40 and 41 compose the measuring system 50. The symbols (c) and (d) are coupling points between the measuring system 50 and the sample 30 to be tested, and the symbol (c) is the output terminal of the measuring system, and the symbol (d) is the input terminal of the measuring system. Also, the reference numeral 20 shows a single mode optical fiber, and 21 shows a multi-mode optical fiber.

The operational principle of the measuring system of FIG. 4 is the same as the prior substitution method which has been utilized for an electrical circuit. According to the system in FIG. 4, the transmission loss in the sample 30 is substituted by the reference attenuator 31.

The feature of the present invention resides in that the optical attenuator 31 and optical switch 41 are designed for a multi-mode optical fiber system, and that a multi-mode optical fiber 21 is utilized between the optical switch 40 and the reference attenuator 31, between the reference attenuator 31 and the optical switch 41, between the coupling point (d) and the optical switch 41, and between the optical switch 41 and the receiver 2. That multi-mode optical fiber is shown by a thick line in FIG. 4.

Figure 5:
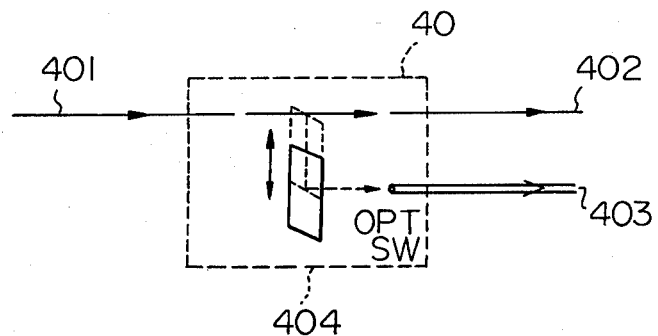
FIG. 5 is the structure of an optical switch according to the present invention.

FIG. 5 shows the structure of the optical switch 40. The input line 401 of the switch 40 is a single mode optical fiber, and the switch 40 has a pair of output lines, one of which is a single mode optical fiber 402, and the other of which is a thick multi-mode optical fiber 403. The input single mode optical fiber 401 and the output single mode optical fiber 402 are positioned on a straight line. The reference numeral 404 is a switching shutter. Therefore, it should be appreciated that the optical path from the input single mode optical fiber 401 to the output single mode optical fiber 402 is not bent and only a switching shutter 404 is inserted between those lines to provide the ON or OFF status of the switch. Accordingly, the optical loss in the switch 40 for a single mode fiber path is very small. When the input energy is switched to the multi-mode optical fiber 403, the path of the optical energy is switched or bent. In this case, since the diameter of the optical mode fiber 403 at the output side is large, that output optical fiber can receive the input energy sufficiently, and so the insertion loss of the switch 40 is still small. Also, the characteristics of the switch 40 is stable and the same characteristics are always obtained. The switching shutter 404 is implemented by a pair of mirrors which bend the optical path by 90 degrees, and are slidable in the perpendicular direction to the single mode optical path 401 (or 402) by an external mannual switching operation.

Further, it should be appreciated that both ends of the optical switch 41, and the both ends of the reference attenuator 31 are connected to multi-mode optical fibers 21. Due to the connection to a multi-mode optical fiber, the insertion loss and/or the stability of characteristics of the optical switch 41 and the reference attenuator 31 are excellent.

Further, it should be noted that the coupling at the point (d) is the coupling between the single mode optical fiber 20 and the multi-mode optical fiber 21 towards the multi-mode optical fiber. Since the coupling between multi-mode optical fibers is not difficult at the present stage, the coupling loss at the point (d) is very small, and is almost zero. Therefore, only the coupling between single mode fibers is the coupling point (c), the insertion loss of which can be less than 0.1 dB at the present stage, and that insertion loss is not significant. Accordingly, the connection between the sample to be tested and the measuring system has no problem.

Although a multi-mode optical fiber is utilized in a single mode optical fiber system in the present invention, the error of the measurement due to that introduction of a multi-mode optical fiber is not important, since the length of that multi-mode optical fiber is very short compared with the sample to be tested.

Most of the components used in FIGS. 4 and 5 can be available in the commercial market or can be produced using a commercially available component. For instance, the optical power source 1 can be the laser HLP-5700 manufactured by the Hitachi Co., Ltd. in Japan, the switch 41 can be the multi-mode optical switch OD-8751 manufactured by Nippon Electric Company in Japan, the attenuator 31 can be the attenuator for a multi-mode optical fiber OD-8500 manufactured by Nippon Electric Company in Japan, the light receiver 2 can be the power meter ML-91A manufactured by Anritsu Electric Company in Japan. The switch 40 can be obtained by modifying said multi-mode optical switch introducing the structure mentioned in accordance with FIG. 5. The connection at the point (c) and/or (d) can be carried out by using a coupling device as shown in FIG. 7.

Figure 7:
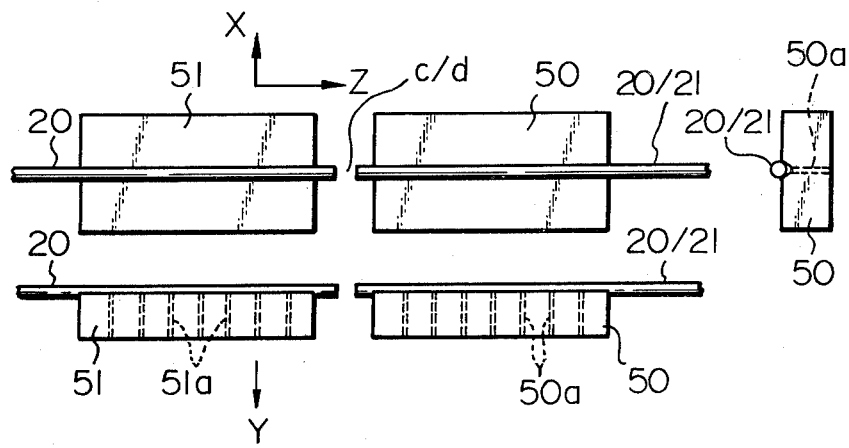
FIG. 7 shows the coupling device of optical fibers.

In FIG. 7, the reference numeral 50 is a fixed bed, and 51 is a variable bed. Each bed is in rectangular shape having V-shaped slit on the surface of one plane. At the bottom of said V-shaped slit there are provided a plurality of thin holes 50a or 51a between said V-shaped slit and the bottom of each bed. Each of said hole 50a and 51a is coupled to the low pressure source (not shown) to provide the low pressure or the vacuum condition at the V-shaped slit. The end of the optical fiber 20 is laid on the V-shaped slit of the bed 51, and the end of the other optical fiber 20 and 21 is laid on the V-shaped slit of the bed 51. The optical fiber laid on the V-shaped slit is fixed on the bed by being pulled by the low pressure. In the above configuration, the variable bed 51 is adjusted so that the end of the optical fiber matches completely with the end of the other optical fiber on the bed 50 by sliding finely the bed 51 in X-, Y- and Z-directions which are perpendicular with one another. The matching condition of the optical fibers is measured by observing the coupling point (c) or (d) using a microscope. After both the ends of the optical fibers match with each other, some liquid oil is provided to the coupling point (c) or (d) in order to provide the unitary or common optical refractive index between the optical fiber on the bed 51 through the coupling point and the other optical fiber on the bed 50. The optical loss by the present of the coupling point (c) and/or (d) can be small enough and that loss can be less than 0.1 dB by using the coupling device as shown in FIG. 7.

As described above in detail, according to the present invention, an optical switch and an optical attenuator designed for a multi-mode optical fiber system are utilized for the test of a single mode optical fiber system, and a multimode optical fiber is partially utilized in the measurement system. Therefore, the measured result is free from the fluctuation of both the optical source and the light receiver, the nonlinearity of the light receiver, the unstable characteristics of both the optical source and the light receiver, and the coupling loss at the coupling points.

Figure 6A:
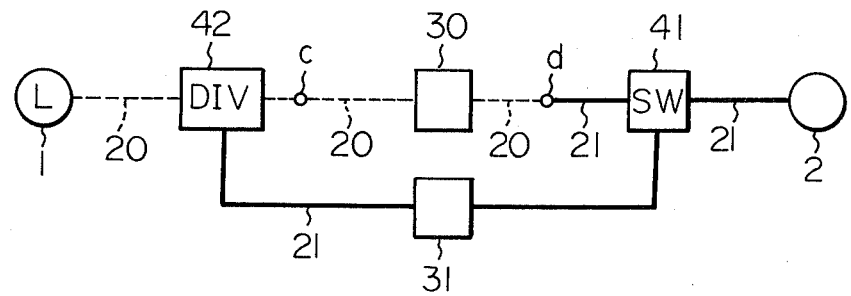
FIGS. 6(A) through 6(D) are modifications of the optical loss measuring system according to the present invention.
Figure 6B:
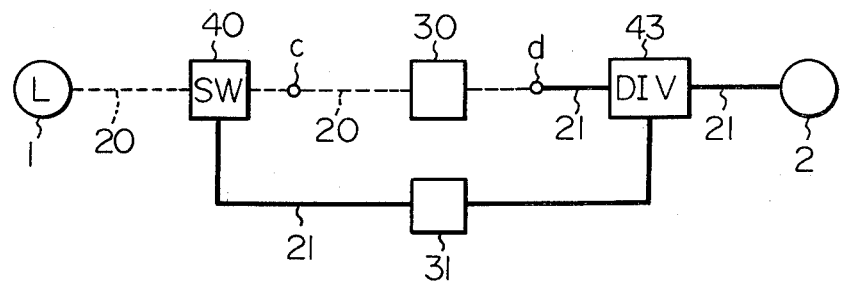
Figure 6C:
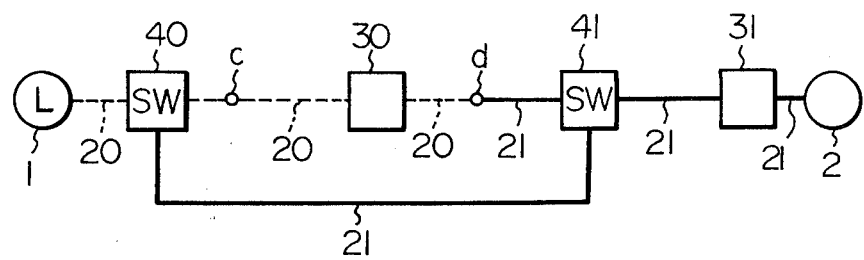
Figure 6D:
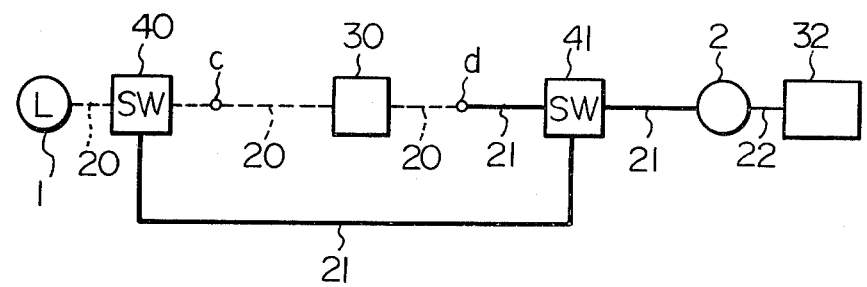

FIG. 6A through FIG. 6D show some modifications of the present invention. FIG. 6A is the modification that the optical switch 40 in FIG. 4 is replaced by the optical divider 42. FIG. 6B is the modification that the optical switch 41 in FIG. 4 is replaced by the optical divider or the optical combiner 43. FIG. 6C is the modification that the reference attenuator 31 in FIG. 4 is connected between the output of the optical switch 41 and the light receiver 2, instead between the optical switches 40 and 41. That configuration of FIG. 6C can also provide the substitution method. In this case, the optical switches 40 and 41 are connected to each other by a multi-mode optical fiber 21. Further, FIG. 6D is the modification of FIG. 6C, and the optical attenuator 31 is replaced by the electrical attenuator 32, which is connected to the output of the light receiver 2 through an electric wire 22.

It should be appreciated to those skilled in the art that the embodiments shown in FIGS. 6A through 6D can provide the same measurement of an insertion loss based upon the substitution method as that of FIG. 4.

In the above explanation, a multi-mode optical fiber is utilized because the diameter of a multi-mode optical fiber is large. The same effect as a multi-mode optical fiber with the large diameter can be obtained by utilizing an optical fiber which has a large numerical aperture (N.A.). The numerical aperture of an optical fiber is defined to be sin $\theta$, where $\theta$ is a critical angle. When the numerical aperture of an optical fiber is large, the incident angle of the beam applied to an optical fiber may be large, and so an optical fiber with a large numerical aperture has the similar effect as that of a multi-mode optical fiber. Accordingly, the multi-mode optical fiber 403 in FIG. 5 can be replaced by an optical fiber having a large numerical aperture, and in this case although the incident angle of the beam applied to the optical fiber 403 is changed due to the change of the mirror 404, the undesirable effect by those changes is small.

It is apparent from the above explanation that the present invention provides the measurement of the optical loss in an optical fiber and/or an optical device for a single mode optical fiber system through the substitution system by introducing partially a multi-mode optical fiber.

From the foregoing it will now be apparent that a new and improved optical loss measuring system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A system for measuring an optical loss in a single mode optical fiber comprising an optical source (1), a sample (30) to be tested, a reference attenuator (31) for replacing the optical loss in the sample (30), a first switch (40) provided between the optical source (1) and the sample (30) through a single mode optical fiber, a second optical switch (41) provided between the sample (30) and the light receiver (2) through an optical fiber, and at least the optical fiber between the sample (30) and the second switch (41) and the optical fiber between the second switch (41) and the light receiver (2) having a larger numerical aperture than that of the sample to be tested.

2. A system for measuring an optical loss in a single mode optical fiber according to claim 1, wherein said optical fiber between the sample (30) and the second switch (41), and the optical fiber between the second switch (41) and the light receiver (2) are multi-mode optical fibers.

3. The invention as defined in the claim 1, wherein said reference attenuator (31) is inserted between the first and the second switches.

4. The invention as defined in the claim 1, wherein said reference attenuator (31) is inserted between the output of the second switch (41) and the light receiver (2).

5. The invention as defined in the claim 1, wherein said reference attenuator is an electrical attenuator and is provided at the output of the light receiver.

6. The invention as defined in the claim 1, wherein the first switch 40 has the input single mode optical fiber and the output single mode optical fiber positioned on a straight line.

7. The invention as defined in the claim 3, wherein said reference attenuator (31) is connected to the first and the second switches through multi-mode optical fibers.

* * * * *